March 13, 1956 — G. N. HEIN, JR — 2,737,946

HYPODERMIC INJECTION APPARATUS

Filed Sept. 1, 1949 — 4 Sheets-Sheet 1

INVENTOR.
George N. Hein, Jr.
BY
Duell and Kane
ATTORNEYS

March 13, 1956 G. N. HEIN, JR 2,737,946
HYPODERMIC INJECTION APPARATUS
Filed Sept. 1, 1949 4 Sheets-Sheet 2

INVENTOR.
George N. Hein, Jr.
BY Duell and Kane
ATTORNEYS

March 13, 1956　　　G. N. HEIN, JR　　　2,737,946
HYPODERMIC INJECTION APPARATUS
Filed Sept. 1, 1949　　　　　　　　　　4 Sheets-Sheet 4

INVENTOR.
George N. Hein, Jr.
BY
ATTORNEYS

United States Patent Office 2,737,946
Patented Mar. 13, 1956

2,737,946
HYPODERMIC INJECTION APPARATUS
George N. Hein, Jr., San Carlos, Calif.
Application September 1, 1949, Serial No. 113,598
10 Claims. (Cl. 128—173)

This invention relates to an apparatus for hypodermically injecting medicaments and especially an apparatus which expels the medicaments in a fine stream and at such velocities that a hypodermic injection is achieved without the use of a skin penetrating needle.

In certain respects the present invention embraces a design embodying functional and structural improvements over those disclosed in my prior application for United States Letters Patent on Injection Assembly, filed on May 29, 1948, and identified under Serial Number 30,047, and now abandoned.

It is a primary object to furnish an apparatus of this type which—if it employs operating fluid such as liquid or air—that fluid will be embraced in a sealed system such that leakage will be substantially prevented. Accordingly it will not be necessary to periodically service the apparatus to replace the fluid which may have escaped. More important is the fact that partial or complete operating failure of the apparatus will not occur incident to losses of operating fluids.

Another object is that of providing a medicament chamber embodying a structure under which proper support and operation of the parts will be achieved regardless of the type of ampule employed.

Still another object is that of furnishing a structure including relatively few parts each individually simple and rugged in construction and capable of quantity production to furnish a relatively economical unit. Moreover, such parts will be capable of ready assemblage and when so assembled will provide a unitary apparatus functioning over long periods of time with freedom from all difficulties.

With these and other objects in mind reference is had to the attached sheets of drawings illustrating practical embodiments of the invention and in which.

By means of the present invention an apparatus is furnished which, as aforebrought out, will primarily produce a hypodermic ejection of medicament without employing a skin penetrating needle. The injection will occur from its initial to its final stage under substantially constant pressure conditions. The apparatus may be repeatedly used and will have a long and effective life.

According to one preferred aspect of the medicament chamber will involve a type of construction such that a proper support will be achieved during the entire expulsion of the solution. The solution containing member within that chamber may be used, sterilized, filled and re-used any number of times. As will hereafter appear, the medicament chamber receives ampules which will be supported against bursting or collapse. The details of such preferred forms of chambers will be later considered.

Referring primarily to the assembly as shown in Figs. 1 to 4, the numeral 10 indicates a casing which, as illustrated, is preferably elongated. This casing supports adjacent one of its ends a loading cap 11 which, for purposes of the present illustration, may be provided with gripping extensions or wings 12 and be retained in position by threads 13. The cap 11 defines the outer end of an ampule-receiving chamber 14. The ampule may take one of numerous different forms. As shown, it includes a flexible cup-shaped container 15 which is preferably formed of rubber and provided with an outer flange portion 16. Detachably associated with the inwardly extending portion of flange 16 is a nozzle 17 which defines an injection orifice of relatively small cross section. For example, it is on the order of from .015" to .003".

Figures 3, 4:
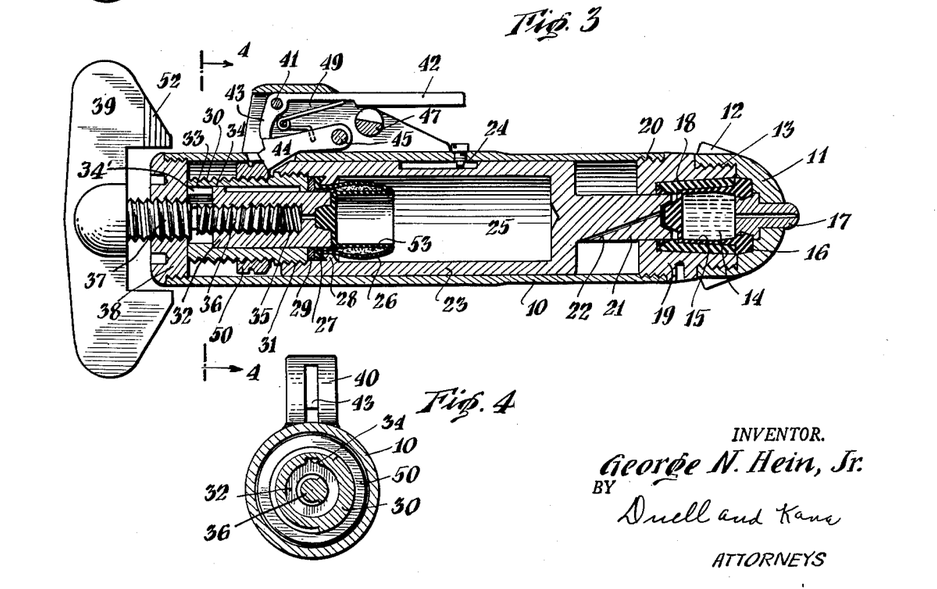
Fig. 3 is a longitudinal sectional view.
Fig. 4 is a transverse sectional view taken along the lines 4—4 and in the direction of the arrows as indicated in Fig. 3.

The body 15 is received within a tubular sleeve 18. The latter may be formed of rubber similar to the ampule or body 15. As shown sleeve 18 is slightly tapered and this tapering has, for purposes of illustration, been somewhat exaggerated. Actually it is on the order of from 1½° to 2°. Sleeve 18 is supported by a collar 19. In common with body 10 and cap 11 this collar is formed of metal. A screw thread mounting is provided for cap 11 and corresponding threads are formed on the outer end of the collar. Similar threads 20 may be provided to connect the collar with the main part of body 10. In line with the inner end of the bore of sleeve 18 collar 19 is formed with an opening which permits of the slidable passage of a plunger 21. To vent any air which may be trapped between the base of the ampule and the outer end of plunger 21, the latter is provided with a passage 22.

The plunger 21 is as shown integral with a member 23 which may be termed a piston. This member is prevented from turning with respect to body 10 by a groove and pin structure 24. Member 23 is hollow and thus provides a chamber 25 which as hereafter described functions as an accumulator and fluid pressure chamber. The rear end of this chamber is sealed by a flexible unit 26 which is again conveniently formed of rubber and comprises a generally cup-shaped unit inverted upon itself. A leakproof seal is furnished between the unit 26 and the slidable member or piston 23 by having the former provided with a flange 27 which seats against a cooperating flange 28 which is part of the latter. A washer 29 may bear against the outer face of flange 27 and the assembly is maintained with its faces in firm contact by utilizing a tube 30 which has, at its inner end, threads 31 cooperating with similar threads formed on the inner face of member 23 adjacent its rear end.

A piston 32 is slidably mounted within tube 30 and by means of a groove 33 and a cooperating projection 34 is restrained against rotation with respect to the tube. The rear end of the bore of this tube is formed with lands to restrict the outward movement of this piston. The latter is formed with a threaded recess 35 within which the end of a correspondingly threaded stem 36 projects. To the rear of this threaded portion the stem is preferably enlarged and formed with oppositely extending threads 37. These engage with corresponding threads formed in a cap 38 secured to body 10. The stem mounts at a point beyond the rear of this body an actuating member which conveniently takes the form of a pair of wings 39 which may readily be grasped by the user. It is therefore apparent that by grasping body 10 with one hand and the actuator 39 with the other, the stem may be turned to cause a projection or retraction of piston 32.

In order to provide a latch or releasing structure body 10 supports on its outer face a mounting 40. The latter, by a pivot 41, serves to rockingly mount a lever 42 provided with an extension 43. A dog or pawl 44 is also pivotally supported by mounting 40 as at 45. A "safety" is furnished by having mounting 40 rotatably carry a shaft 47 which may be notched or ground down as indicated in Fig. 3. This shaft underlies lever 42 and has secured to it an operating extension 48. The mounting 40 may be provided with symbols indicating, for example, "Safe" and "Fire" between which the extension may be swung. When that extension is in the position shown in Fig. 2 then shaft 47 will prevent any inward movement of lever 42. When the extension is in the position shown in Figure 3, the notched or relatively reduced part of shaft 47 will underlie lever 42 and the latter may be swung inwardly. A spring 49 is also conveniently supported by mounting 40 and has its opposite ends bearing against lever 42 and the dog or pawl 44 to urge them in opposite directions.

A stop cooperative with the pawl 44 is furnished by mounting a nut 50 upon threads which are formed upon the exterior face of tube 30. This nut conveniently has a forward or beveled face which may be engaged by the adjacent face of pawl 44; the latter being held against movement by the locking extension 43 of lever 42. The nut or collar 50 is adjustable throughout the adjacent surface of tube 30 by being rotated around the screw threads of the latter which mount it. At this time it is also to be observed that a graduation 51 may be provided on the outer face of casing 10 adjacent the rear end of the latter. This graduation will register with one of a series of graduations 52 provided upon a portion of one of the wings 39 which overlies that rear end of the casing.

In assembling the structure as shown in Figs. 1 to 4, the space intervening the layers of element 26 is filled with a suitable lubricant indicated at 53 and which includes graphite. The threads on stem 36 should, of course, be suitably lubricated. The accumulator chamber 25 will be charged with fluid under pressure. Such fluid may conveniently be nitrogen under suitable pressure (for example, 1200 to 5000 lbs. per sq. in.). With the "safety" in position, loading cap 11 is removed and an ampule is disposed within the medicament-containing chamber.

Figure 1:
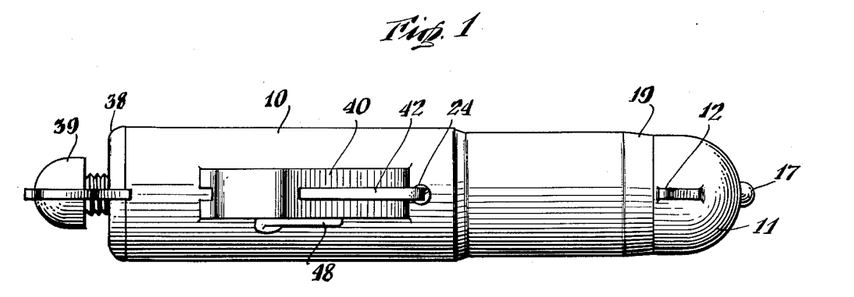
Fig. 1 is a plan view of an injection apparatus.
Figure 2:
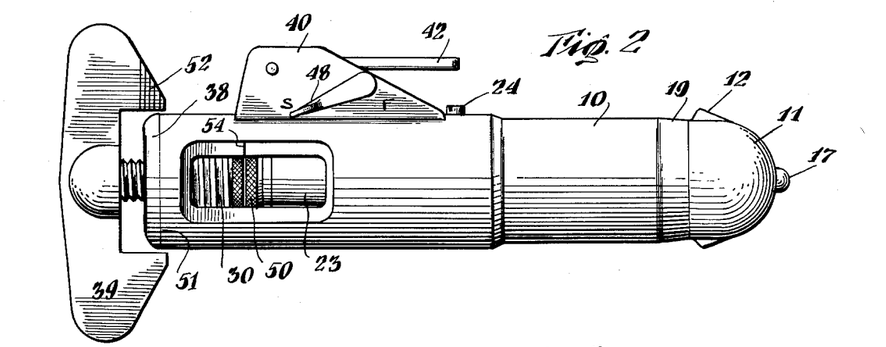
Fig. 2 is a side view thereof.

The cap is re-applied and nozzle 17 will extend beyond the end of the same. Now by effecting relative turning of body 10 with respect to the actuator 39, piston 32 will be projected and will tend to carry with it tube 30. If collar 50 is adjusted to an extreme position as shown in Figs. 2 and 3 and aligns with graduation 54 on casing 10, then any tendency of tube 30 to thus move will be prevented because of the immediate engagement of collar 50 with pawl 44. Under these circumstances, piston 32 will simply move inwardly of accumulator chamber 25 containing the operating fluid and will serve to compress the body of that fluid to an extent greater than its initial compression. A continuation of this operation will result in piston 32 being fully projected. At that point flexible element 26 may no longer be inverted upon itself but merely extend inwardly in the form of a closed tube. Under these circumstances, forward movement of member 23 is prevented incident to the engagement of dog or pawl 44 with the collar or nut 50.

Nozzle 17 is now disposed adjacent the tissue to be penetrated. The "safety" is released. Upon lever 42 being swung, the locking extension 43 thereof moves beyond the adjacent face of pawl 44. The surface of the latter, in engagement with collar 50, will now cam against the action of spring 49. Therefore, member 23 will be released so that its plunger 21 may move against the base of ampule 15 and collapse or invert the latter to eject the solution contained therein through the orifice of nozzle 17. This will result in the desired injection. With the forward movement of member 23 element 53 will again assume an inverted position. In other words it would be inverted upon itself. This will be because member 23 will move while projecting member 32 remains stationary. The base of the cup is carried by the latter while the flange portion thereof is carried by member 23. Assuming that medicament chamber 14 has a capacity of 1 cc., then the graduations 52 may each define one-fifth of 1 cc. By turning actuator 39 with respect to the body to where one of more of these graduations align with graduation 52, a corresponding dosage will be ejected from the medicament chamber. Likewise by adjusting collar 50 along the threads which mount it, a desired amount of the fluid dosage will be ejected. It is obvious that the foregoing volumes are only illustrative and that the capacity of the device might be greater or less than 1 cc.

With the unit charged a reverse turning of the actuator 39 with respect to body 10 will cause piston 32 to be retracted. Plunger 21 will also be withdrawn from the medicament chamber. The loading cap 11 may thereupon be dismounted, and the spent ampule discarded or refilled. In any event, with an ampule in position, the entire operation may be repeated; it being understood that with the retraction of the piston, dog or pawl 44 will, under the influence of spring 49, reassume a position in which it is locked against movement.

Figure 5:
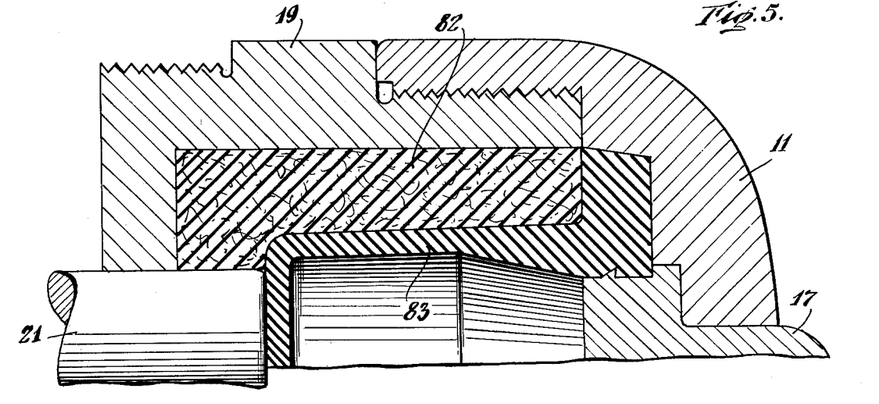
Fig. 5 is a somewhat schematic view showing in enlarged section one form of medicament chamber and the parts adjacent thereto.
Figure 6:
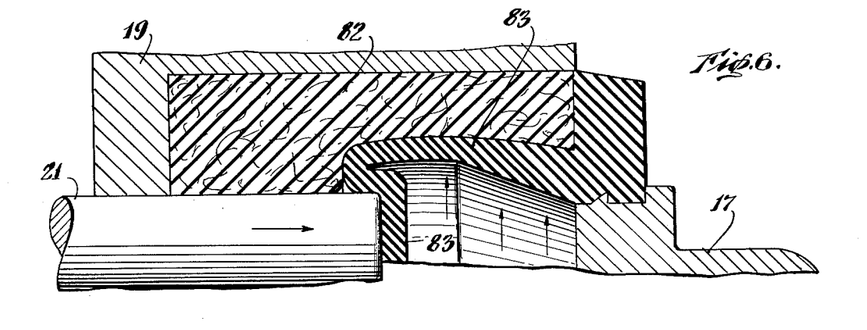
Fig. 6 is a view similar to Fig. 5 but showing the position of the parts during the expulsion of medicament from the chamber.

Now referring to Figs. 5 and 6 a detailed showing of the assembly providing the medicament chamber has been illustrated. Supported within the latter is an ampule formed of flexible, solid rubber which is relatively soft. Interposed between this unit and the exterior metallic walls of the assembly is a layer 82 of relatively softer rubber corresponding to sleeve 18. This should be free of air pockets or, in other words, be solid. As shown, the cup 83 adjacent its outer flange is thickened.

With an assembly such as this, if the plunger 21 is projected, the surface of cup 15 will, in effect, be peeled out of contact with the surface of layer or sleeve 82. This action has been shown in Fig. 6 and it will be understood that it will occur with little or no chafing or friction taking place between the layers and will continue as the plunger advances. That portion of the cup beyond its base will displace outwardly in sleeve 82, incident to the cup inverting, and immediately fills in the space short of the cup base as the inverting action is continued. As will be appreciated, with the advance of plunger 21, the cup expands radially Therefore, this displaced rubber prevents the sack from distending rearwardly and from being subjected to undue stress or strain. In effect layer 82 urges the material of the cup forwardly due to the peristaltic-like action which occurs incident to the medicament pressure within the cup. In this respect it will be understood that the inner surface of the cup is not alone supported by the medicament pressure as plunger 21 advances, but it is also lubricated thereby.

Figure 7:
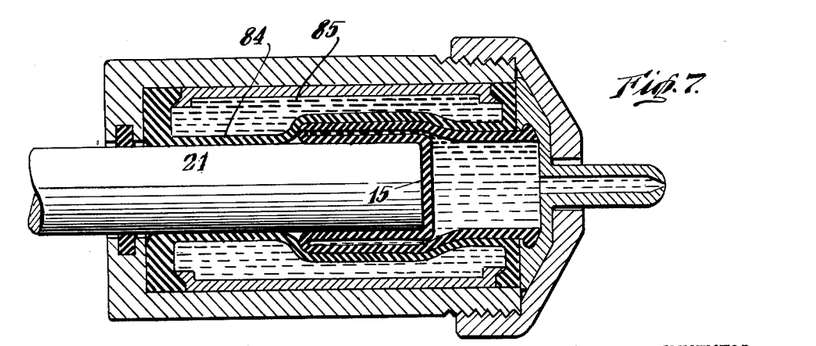
Fig. 7 is a similar and somewhat schematic view showing a structure alternative to that illustrated in Figs. 5 and 6.

As at present visualized, the medicament chamber assembly may preferably embrace a structure as in Figs. 5 and 6. It is apparent, however, that other assemblies might also be employed and in certain instances these might even include a provision for an external support of any ampule or similar unit disposed in the medicament chamber. In this connection and as shown in Fig. 7, the outer end of the unit is defined by a sleeve 84 of suitable rubber in sealing contact with the outer casing. Encircling the sleeve is a body 85 of liquid. The sleeve receives a cup such as 15 with which the plunger 21 cooperates.

It is obvious in this form of construction that as plunger 21 advances cup 15 will be inverted. Incident to this action portions of sleeve 84 will be displaced. The liquid 85 being substantially incompressible it follows that with this displacement an inward or supporting pressure will be exerted by the forward portions of the sleeve against those portions of the cup which are still filled with medicament. Accordingly, while it is preferred that cup 15 directly contain the medicament it is apparent that if it should enclose an ampule, the latter will be supported against bursting should such a result be desired. Also as heretofore described, the fluid medicament will act to lubricate the adjacent surfaces of the cup 15 as the latter inverts and peels out of contact with sleeve 84.

Now referring to the structures shown in Figs. 8 to 11 inclusive, it will be observed that the numeral 86 indicates the outer casing. Swingingly connected to the latter by a loose pivot coupling 87 is a cap 88 which defines the medicament chamber. As heretofore described, the latter mounts a rubber sleeve defining a space suitable for the reception of a medicament containing cup with which a nozzle is associated. A securing ring 89 is rotatably coupled to cap 88. As shown, especially in Fig. 11, this cap and the adjacent surface of body 86 is formed with interrupted threads 90. Accordingly by bringing the parts to positions adjacent each other and merely rotating them through an arc of approximately 90° they may be firmly secured against movement. Conversely by effecting a relative rotation of the same in an opposite direction the cap may be freed to swing around pivot 87. When so swung access may be had to the medicament chamber for removing the exhausted cup or equivalent part therefrom and replacing it with a fresh unit.

Figures 8, 9, 10, 11, 12, 13:
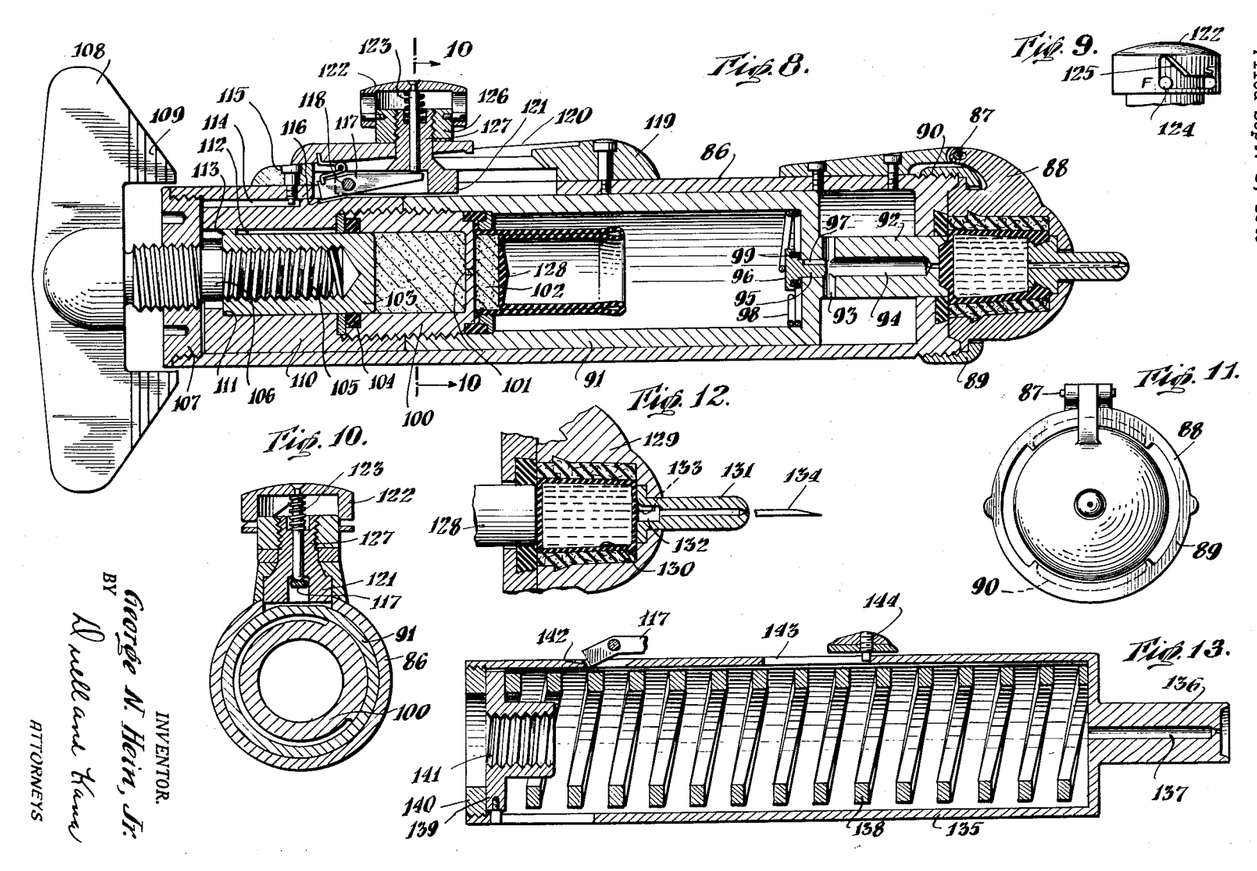
Fig. 8 is a view similar to Fig. 3 but showing a different assembly.
Fig. 9 is a fragmentary elevation of a detail of the mechanism as shown in Fig. 8.
Fig. 10 is a transverse sectional view taken along lines 10—10 and in the direction of the arrows as shown in Fig. 8.
Fig. 11 is a sectional end view of the unit shown in Fig. 8.
Fig. 12 is a fragmentary view of an alternative form of medicament chamber.
Fig. 13 is a sectional side view of an assembly which may be employed for creating the necessary mechanical force.

Slidably mounted within body 86 is a hollow member 91 the forward end of which terminates in a plunger 92 for cooperation with the medicament chamber. This plunger is formed with a transverse bore 93 in addition to a longitudinal bore 94. Communication between these bores and the interior of member 91 is normally prevented by employing a suitable valve assembly. The latter includes a stem 95 terminating in an inward head 96 and having a vent groove 97. A spring 98 urges stem 95 in an outward direction and a washer of rubber 99 is mounted by this stem and partially enclosed by cap 96 to thus normally prevent any flow of fluid through groove 97. If, for discharge purposes, such flow is to be initiated, then by inserting a suitable instrument through bore 93 a thrust may be exerted on stem 95 to allow of an escape of fluid. Conversely, if the interior of member 91 is to be charged with, for example, nitrogen under a suitable pressure, then by employing a proper fitting which is brought into operative relationship with the bore of plunger 92 a charging flow may be achieved past the valve. With the completion of such charging the valve will return to seated position to prevent any escape of the gas from the interior of member 91.

Secured against rotation with respect to this member is a sleeve 100. The forward end of the latter is closed except for a relatively small passage 101. This sleeve provides a bore functioning as a cylinder 102 which is filled with grease, oil or other displaceable material. A piston 103 extends into this bore and a suitable O-ring packing 104 may be provided between the piston and cylinder to prevent an escape of the displaceable material. The piston is formed with a threaded bore 105 within which the inner end of a threaded plunger 106 extends. The outer end of this plunger is oppositely threaded and bears against the threads of a closure plug 107. Secured to the rear end of plunger 106 are operating surfaces which takes the form of wings 108 corresponding to the structure heretofore described in Figs. 1 to 4 inclusive. Also in common with that structure graduations 109 are provided to indicate the operative capacity to which the parts have been adjusted. The rear end of piston 103 is encircled by a collar 110 which is provided with a land 111 and groove 112 for cooperation with outwardly extending guiding portion 113 forming a part of piston 103. Collar 110 is also formed with one or more longitudinally extending grooves 114 within which the inner end of a set screw 115 rides for preventing a turning of the collar.

A releasable latch structure is furnished by having the collar formed with a shoulder 116 which cooperates with the end of a latch. Lever 117 is pivoted as at 118 and normally maintained in seated position by a spring. The outer face of casing 86 mounts a guide unit 119 which has its outer face 120 extending in an inclined plane. A carriage 121 is reciprocable in the guide unit and supports a cap 122. The latter mounts a pin 123 which engages the inner end of lever 117. By means of a loose connection defined by a pin 124 and a slot 125, cap 122 is coupled to a nut 126; additional guiding means being also preferably employed between these elements. The nut rides on the threaded stem 127 which, at its lower end, terminates in the carriage 121. As shown, rotation retarding means such as a spring is employed to prevent a free or accidental movement of cap 122 with respect to nut 126. Also as shown, especially in Fig. 9, slot 125 has one reduced end portion conveniently identified by the letter "S" and a somewhat enlarged or flared opposite end portion conveniently identified by the letter "F." These identifications may designate "Fire" and "Safe" respectively. Finally, as shown in Fig. 8, an inverted sack 128 preferably of rubber, has its ends anchored against the escape of fluids from within the body of member 91, its base portion defining a barrier against the entrance to the body of grease, oil, or other operating liquid within chamber 102 and the space between the end wall of sleeve 100 and the interior of member 91.

Considering the operation of the mechanism as illustrated and described in connection with Figs. 8 to 11, it will be assumed that the medicament chamber is filled and that the interior of member 91 is charged with air or gas under pressure. The preferred method of so charging has been previously described and the value of the charge may be on the order of 1500 pounds per square inch. It will moreover be assumed that the displaceable material 102 is in position. Under these circumstances it will be appreciated that this material will be under an equal degree of pressure and will therefore react against packing 104 so that an effective seal is furnished. In this connection it will be understood due to the fact that the material is under such initial pressure that the packing is under a correspondingly high pressure. Therefore seepage or leakage will be reduced to a minimum. With the capacity of the medicament chamber being 1 cc. and it being desired to inject the entire capacity of this chamber, the procedure will be as follows:

Carriage 121 will be shifted to the left to its extreme position as shown in Fig. 11. In such movement member 91 will be correspondingly shifted to retract the plunger 92 so that cap 88 may be secured by rotating ring 89. Of course before carriage 121 is shifted to the left, cap 122 will be rotated in a counter-clockwise direction to cause nut 126 to be elevated to free the carriage 121. With the parts so shifted, cap 122 will be tightened or as shown rotated in a clockwise direction. This will cause pin 124 to initially ride into the reduced end portion of slot 125 and thereupon will cause nut 126 to ride down stem 127 to clamp carriage 121 against movement. Stem 106 is now rotated to project piston 103. Under these circumstances, carriage 121 will not shift even though cap 122 has been tightened by merely gripping the same with the fingers and turning it in clockwise direction with reasonable force. This will be because any tendency of carriage 121 to move to the right as viewed in Fig. 11 will immediately result in the establishment of a wedging action incident to contact with surface 120. Therefore, the projection of stem 103 may be continued up to the limit of its movement.

With such projection the material 102 will be displaced through opening 101 and cause sack 128 to be distended mainly by moving the base portion of the sack inwardly of the chamber defined by member 91. Under these circumstances the pressure of the gas within that chamber will be increased. The nozzle may now be disposed in a position overlying the tissues to be injected. By turning cap 122 in a counter-clockwise direction, the parts are shifted from a "Safe" to a "Firing" position. Therefore, if cap 122 is pressed inwardly, stem 123 will be projected to rock lever 117 to a position at which it clears shoulder 116. Under these circumstances, member 91 will project carrying with it plunger 92 which will cooperate with the medicament chamber in the manner aforedescribed to expel the solution in a sufficiently fine stream and at velocities and under pressures such that the desired hypodermic injection will be effected. Thereafter, piston 103 may be retracted, cap 88 may be released and the exhausted cup removed and replaced by a fresh cup or ampule. In common with the structures heretofore and hereafter described, this element may be sterilized and refilled for future use.

Of course if a full injection of 1 cc. is not desired, then it is apparent that, as before described, stem 113 may be rotated by the wings 108 or otherwise so as to be only partly projected. The degree of such projection will be indicated by the scale marks or other indicia 109. In the event it is desired to employ a rupturable ampule as the medicament container, the structure as disclosed in Fig. 12 may be employed. In that view, numeral 128 indicates the projectible plunger and 129 the parts of the assembly which define the medicament chamber. Within the latter a container 130 formed, for example, of tin or gelatin is disposed. Beyond this, a nozzle 131 is mounted and the outer end of which will define an orifice of sufficiently reduced diameter to provide the desired fluid jet. The base of this nozzle is formed with a recess 132, one edge of which is rounded as at 133. Therefore, the plunger 128 which projects the solution within container or ampule 130 will be placed under pressure. The rounded surface 133 of recess 132 will furnish a guide such that as the pressure increases the body of container 130 will rupture or sever along the relatively sharp edge defining the inner end of recess 132 and will hinge or fold over surface 133. Therefore, a flap will be provided incident to the rupturing and no fragments will be present which will lodge within the bore of the nozzle or otherwise interfere with the proper operation of the device.

As indicated by the numeral 134 a needle might be furnished which will be mounted in any suitable or accepted manner on the hub defined by nozzle 131. Under these circumstances the outer end of such nozzle should preferably not be reduced. Rather an acceptable bore of any proper diameter could be defined by this nozzle portion. Obviously needles could also be employed at the same point in connection with apparatus as heretofore or hereafter described. It is to be understood, however, that the apparatus herein disclosed is primarily intended for injections of the velocity type rather than for employment with a skin penetrating needle and the illustration under numeral 134 is therefor merely suggestive of the possible use of the apparatus.

As in Figs. 1 to 4 the motive force depended upon for operation of the assembly is purely air or gas under pressure. In Figs. 8 to 11 gas under pressure and hydraulic operating liquid system is included. Under certain circumstances it might be desired to employ a structure in which no gas accumulator is present. In such an event, a mechanism as illustrated in Fig. 13 might be utilized.

In that view the numeral 135 identifies the member corresponding to member 91. This member is provided with a plunger 136 which is formed with a venting bore 137. A spring 138 is disposed within the member and has its forward end bearing against the inner face of the end wall of that member. A collar 139 is disposed adjacent the rear end of the member and a backing ring 140 is arranged beyond this collar to confine the spring. A threaded bore 141 forms a part of collar 139 and is engaged by the threads of a stem as shown and described in connection with Fig. 11. Member 135 may be formed with an opening to define an edge 142 which acts as a stop shoulder similar to shoulder 116 and with which the end of a lever 117 cooperates. Also it is formed with an opening 143 within which a pin 144 rides to restrain the member against rotation. That pin or screw would serve the same function as the groove 114 and the screw 115 of Fig. 8.

It is obvious that with a structure as shown in Fig. 13, a rotation of the stem would result in a cocking of the apparatus as previously described. Also a shifting of lever 117 would release member 135 and its plunger 136 so that it would project to expel the medicament from its chamber. Due to the provision of bore 137 any air entrapped between the base of the medicament chamber and the end of the plunger would be vented. Allowing for these differences in detail, the apparatus would function precisely in the manner described in the earlier figures, excepting that the pretensioned spring 138 would make it unnecessary to utilize an accumulator system in which gasses or gasses and liquid would be confined under high pressures.

Figure 14:
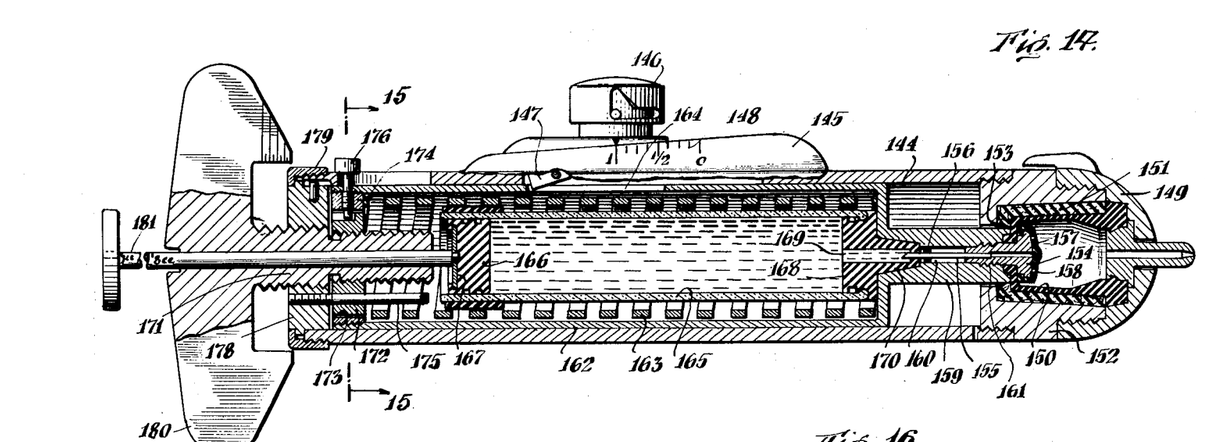
Fig. 14 is a view similar to Fig. 8 but showing a still further form of structure.

Now referring to the assembly shown especially in Fig. 14 it will be observed that the numeral 144 indicates the main casing of the device and 145 a mounting extending therefrom and beyond which there projects a cap 146. Inwardly of this mounting a pivoted lever 147 is disposed. These parts correspond to the similar parts heretofore described in Fig. 8. In common with the structure in the earlier figure, a scale 149 appears upon the outer face of mounting 145 and is traversed by a suitable indicating mark associated with the carriage. A cap 149 closes the outer end of the medicament chamber within which a cup 150 is disposed within a lining sleeve 151 of relatively soft, displaceable rubber. The sleeve itself is anchored against displacement within a collar 152 and the inner end of the sleeve conveniently embraces a zone 153 of relatively hard rubber.

Contrary to the constructions heretofore described, the base of cup 150 is formed with an opening. Extending into the latter is a bored stem 154. The inner end of that bore is continued in the form of a cannula 155 terminating in a point and preferably mounting upon its shank a collar or spacing member 156. A cap 157 is conveniently snapped onto stem 154 and covers the inner face of the latter. This cap is formed with a suitable number of perforations 158. The diameter of the latter, as well as the bore of the cannula, should be substantially in excess of the jet-defining orifice of the nozzle associated with the outer end of cup 150.

The plunger 159 is formed with a bore 160, the outer end of which is threaded to cooperate with the threads 161 of stem 154. The outer end of bore 160 is surfaced so as to generally conform to the adjacent faces of stem 154. The diameter of bore 160 is such that it will accommodate the spacing member 156. A projectible member 162 is preferably integral with stem 159 and houses a spring 163 which is under initial compression. Member 162 is conveniently formed with a slot 164 defining a rear shoulder functioning as a stop in cooperation with lever 147. As will be observed, the convolutions of spring 163 define a space. This space is ample in area to accommodate a medicament-containing ampule.

Such an ampule conveniently formed of glass has been indicated at 165. The rear end of the ampule is closed by a stopper 166 which conveniently presents upon its outer face a centrally perforated disk 167. The inner end of the ampule is closed by a stopper or cap 168 formed with a bore 169 which extends into its nose portion 170. The inner end of bore 160 is surfaced to conform to this nose portion. It will be observed that the length of the cannula 155 is such that with the parts disposed in the manner shown in Fig. 14, its pointed inner end will pierce the end of nose portion 170 and lodge within the bore 169.

Adjacent the rear end of casing 144 a stem 171 is disposed. This stem has oppositely extending threads as in the case of the stems of earlier described forms. The threads adjacent the inner end of this stem cooperate with the threads of a collar 172 conveniently having outstanding ribs or splines 173 riding within grooves formed in a sleeve 174. A pin 175 extends transversely of and through an opening in collar 172. A set screw 176 projects beyond the casing 144 and has engagement with the threads of a bore formed through sleeve 174. The inner end of this set screw extends into a groove 177 formed in collar 172. A plug 178 is mounted by the rear end of body 144 by, for example, a ring 179 and is prevented from rotating with respect to casing 144. Wings or other suitable manipulating portions 180 are secured to stem 171 so that it may be turned. These wings are spaced and the stem is formed with a bore such that a graduated pusher rod 181 may be inserted into the interior of the casing and disposed in operative relationship with the stopper 166.

As will be apparent pin 175 prevents collar 172 from rotating with respect plug 178. However, this collar may be projected and retracted by rotation of stem 171. With such shifting it is apparent that the projecting portions 173 will bear against the rear end of spring 163 so that this spring will be compressed to an even greater extent. Therefore, with operation of the latch structure, member 162, together with its plunger 159 may be projected in order to invert the cup 150 and expel medicament therefrom or to otherwise co-act with the medicament containing chamber in order to effect such expulsion.

In operating this unit the cocking assembly is primarily removed. That assembly will include the plug 178, the stem 171, the ring 179 and collar 172. The filled ampule 165 may now be disposed in position. So positioned its inner end will bear against the end wall of member 162 and the nose portion 170 of stopper 168 will bear against the adjacent surfaces of bore 160 of plunger 159. With cap 149 removed, cup 150 may be inserted into the space defined by backing sleeve 151. The operator will use care to introduce cannula 155 into bore 160 and to engage thread 161 of plug 154 with the thread of that bore. With such introduction it is obvious that the spacing element 156 will prevent the sterile needle point from touching the wall of bore 160. It is also apparent that the pointed end of the cannula will penetrate the outer end of the nose portion 170 and be in communication with the interior of bore 169 which is filled with medicament.

If now, the push rod 181 which is preferably graduated is inserted through the bore of stem 171, its reduced end will center in the aperture or recess of disk 167. Continued projection of rod 181 will shift stopper 166 inwardly. Accordingly the latter will function as a piston to expel medicament through bore 169 and the bore of the needle or cannula past the valve structure provided by the adjacent surfaces of stem 154 and cap 157 and into the medicament chamber 150. If the unit is therefore held in a substantially upright position, this action may be continued until medicament completely fills the cup or chamber 150 and flows through the orifice of the nozzle associated therewith. The operator will now know that the chamber is charged. Assuming the capacity of the latter to be 1 cc. and the rod 181 to have been projected to a corresponding extent as evidenced by the graduations carried by that rod, then the latch actuating cap 146 may be turned in a clockwise direction as viewed in Fig. 14. Thereupon that cap will be tightened as aforedescribed and the entire apparatus will be on "Safe" position. With the cocking assembly properly mounted by casing 144 actuator 180 may now be turned. This will result in the pretensioned spring 163 being compressed to an adequate extent. Thereupon, by operating the release cap 146 as aforedescribed the desired projection may be achieved. In such projection, a return flow of liquid from the cup 150 into the reservoir or ampule 165 is prevented by the check valve structure afforded by cap 157 in cooperation with the surface of stem 154 and in view of the fact that the perforations 158 of the cap are not aligned with the adjacent end of the passage between the reservoir-ampule and the medicament chamber. Subsequent injections may be accomplished by simply re-cocking the cocking mechanism, shifting member 162 rearwardly, locking the parts by turning the cap and thereupon projecting rod 181 as aforedescribed. This will again fill the medicament chamber and the cocking mechanism will again be operated. With the parts proportioned in the manner shown the ampule 165 will hold approximately eight charges of 1 cc. each. Therefore, eight successive operations of the apparatus may be accomplished before it is necessary to again remove the packing assembly, withdraw the exhausted ampule 165 and reload the apparatus.

Figures 15, 16:
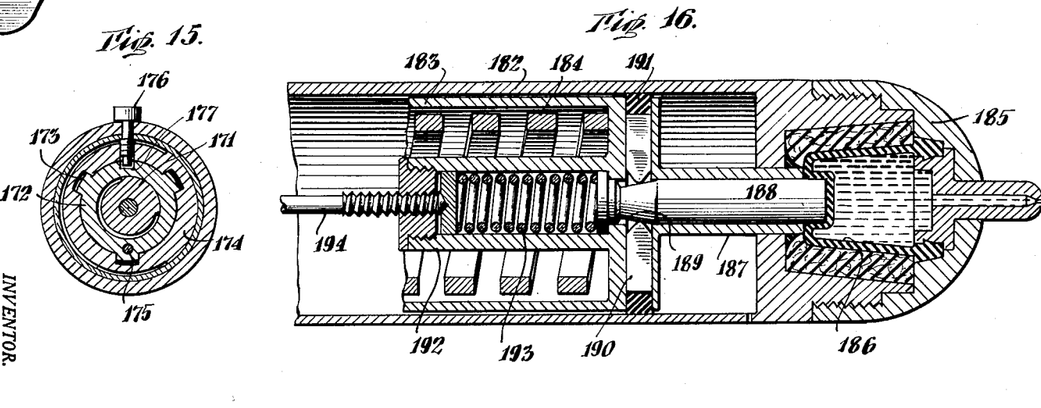
Fig. 15 is a transverse sectional view taken along the lines 15—15 and in the direction of the arrows as indicated in Fig. 14.
Fig. 16 is an enlarged fragmentary sectional view of a structure employing a motivating spring assembly exerting a substantially uniform operating force.

Finally, referring to Fig. 16, it will be seen that the numeral 182 indicates the main casing of the apparatus with the outer end of which a loading cap 185 may be associated. The medicament chamber at that outer end may contain a cup 186 as heretofore described and which is capable of inversion within a layer or sleeve of relatively soft rubber. A nozzle is associated with the cup. A plunger 187 in the form of a tube cooperates with the base of the cup and a rod 188 is slidably disposed within the bore of tube 187. Cam surfaces 189 may form a part of rod 188 and cooperate with radially extending rods 190 which have at their outer ends brake-surfacing material 191 cooperating with the inner face of casing 182.

A member 183 is slidably mounted in that casing and has disposed within it a pre-loaded main spring 184. A tube portion 192 may extend rearwardly from the outer end wall of member 183 and house a pressure-regulating spring 193 acting upon the base of rod 188. An adjustment screw 194 may serve to tension, to a greater or lesser extent, spring 193. At this time it is to be observed that the convolutions of the latter spring are spaced a distance such that it would definitely limit inward movement of rod 188. If other stop means are desirable, then they may be employed in lieu of this convolution spacing.

In any event, it will be appreciated that with a structure such as has been shown in Fig. 16, member 183 may be potentialized for forward projection in a manner such as has been heretofore outlined. With the medicament chamber filled, and the member 183 released for projection, the latter will move forward under the full force of spring 184 which is now under a maximum condition of tension. Due to the fact that the sack 186 is filled with liquid the outlet of its nozzle is restricted, it is apparent that internal pressure will be immediately built up under the foregoing circumstances. Such internal or back pressure will cause the base of the sack to bear against plunger 188. Due to the fact that the latter is urged in an outward direction merely by the relatively weak spring 193, any excessive pressures within the medicament chamber will result in rod 188 moving rearwardly thus forcing the brake material 191 into operative engagement with the inner face of casing 182. The greater the degree of reaction the more intimate will be the engagement between the braking material and the inner face of the casing. Therefore, under these circumstances, the force with which member 183 is projected will be diminished. Conversely, as the pressure within the medicament chamber diminishes, the braking action will also diminish because rod 188 under the influence of spring 193 will move outwardly. This relationship of the parts may be adjusted with nicety by shifting screw 194 to tension spring 193 to a greater or lesser extent.

Now considering the values which may be incorporated in the assembly as shown in Fig. 16, it will be assumed that the maximum injection pressure desired within chamber 186 is 2,000 pounds per square inch. Ignoring all question of frictional losses, the main spring 184 will, under these circumstances, be preloaded to a value of substantially 220.8 pounds. With spring 184 fully compressed, it may have a thrust value of substantially 331.2 pounds. In the apparatus under consideration it will be assumed that to assure such complete compression a ½ inch shift inwardly of the main spring will be resorted to. It will also be assumed that the plunger assembly 187—188 has a ⅜ inch diameter. Under these circumstances, the minimum thrust exerted by main spring 184 will, as aforebrought out equal 220.8 pounds on the plunger. With the area of the latter this will equal a pressure of 2,000 pounds per square inch within the medicament chamber. Thus, the excess force which is to be regulated by the brake structure will be the difference between the maximum thrust of the main spring (331.2 pounds) and the minimum thrust exerted by that member (220.8 pounds). This will represent a maximum differential of 110.4 pounds which, at the end of the stroke will have diminished to zero. With the injection pressure commencing at 2,000 pounds to the square inch plus the amount of pressure required to overcome the frictional resistance of the parts, it is apparent that if plunger 188 has a 3/16 inch overall diameter and due to the cam surfaces 189 has a ten to one mechanical advantage on the brake elements or shoes 191, then each pound of pressure over the optimum of 2,000 pounds will apply a .276 pound force on the brake shoe. For example, 2,100 pounds per square inch might impart (with properly related surfaces) 27.6 pounds force on the braking units. If the load provided by spring 193 is 54.2 pounds on internal plunger 188, the latter will just support a 2,000 pounds per square inch medicament pressure. As is apparent, the foregoing figures are merely illustrative. By varying the ratios involved, greater or lesser force might be achieved through the use of a spring 184 or other motive force of the same value. Likewise, a spring which exerts a greater or lesser thrust might be utilized. These variations together with numerous manners of applying the desired braking action will be obvious to a person possessing the necessary mechanical skill.

Thus, among others, the several objects of the invention as specifically aforenoted are achieved. Obviously numerous changes in construction and rearrangement of the parts might be resorted to without departing from the spirit of the invention as defined by the claims.

I claim:

1. A hypodermic injection apparatus including a body providing an ampule-receiving chamber, a flexible invertible solution-containing cup within the same, means for causing the base of said cup to be shifted towards the cup lip to invert the side walls thereof upon one another and a lining interposed between the face of said chamber and the cup side walls, said lining comprising a layer of compressively displaceable material yielding within the zone of the cup as the latter inverts and expands radially to press against the adjacent face of said layer and to correspondingly constrict the same to the rear of said cup base as the latter shifts towards the cup lip.

2. A hypodermic injection apparatus including in combination a tubular body, mounting means adjacent one end of said body for retaining a medicament chamber-defining element in association therewith, a member movable within said body and having a part projectible towards said element to expel medicament therefrom, said member providing a space charged with expansive fluid under pressure, a flexible diaphragm carried by said member and extendable into said space to provide a pressure accumulator structure, a cap closing the opposite end of said body, a stem having threaded engagement with said cap and extending beyond the outer and inner faces thereof, means secured to said stem at a point beyond the outer cap face whereby said stem may be turned, a unit having threaded engagement with said stem at a point within said body and connected to said diaphragm to extend the latter into said member to increase the expansive force of said accumulator structure and means for releasing said member for movement.

3. A hypodermic injection apparatus including in combination a tubular body, mounting means adjacent one end of said body for retaining a medicament chamber-defining element in association therewith, a member movable within said body and having a part projectible towards said element to expel medicament therefrom, said member providing a space charged with expansive fluid under pressure, a flexible diaphragm carried by said member and extendable into said space to provide a pressure accumulator structure, a cap closing the opposite end of said body, a stem having threaded engagement with said cap and extending beyond the outer and inner faces thereof, means secured to said stem at a point beyond the outer cap face whereby said stem may be turned, a unit having threaded engagement with said stem at a point within said body and connected to said diaphragm to extend the latter into said member to increase the expansive force of said accumulator structure, a projecting part carried by said member and a manually releasable latch carried by said body and cooperable with said part to releasably retain the latter and said member against movement.

4. A hypodermic injection apparatus including in combination a tubular body, mounting means adjacent one end of said body for retaining a medicament chamber-defining element in association therewith, a member moveable within said body and having a part projectible towards said element to expel medicament therefrom, said member providing a space charged with expansive fluid under pressure, a flexible diaphragm carried by said member and extendable into said space to provide a pressure accumulator structure, a cap closing the opposite end of said body, a stem having threaded engagement with said cap and extending beyond the outer and inner faces thereof, means secured to said stem at a point beyond the outer cap face whereby said stem may be turned, a unit having threaded engagement with said stem at a point within said body and connected to said diaphragm to extend the latter into said member to increase the expansive force of said accumulator structure, said member presenting an open rear end, said unit being moveable towards the interior of said member through said rear end and means for releasing said member for movement.

5. A hypodermic injection apparatus including in combination a hollow body providing adjacent one of its ends a chamber to receive a medicament-containing ampule, a hollow piston member reciprocal within said body, a plunger at one end of said member and projectible into said chamber to cause expulsion of medicament therefrom, a force-compounding means movably supported with respect to said body and extending adjacent its opposite end, means within said body and operatively connected to said force-compounding means to be projected thereby into the interior of said hollow piston member, means forming a part of said apparatus including said hollow piston and the means projectible into the interior thereof to provide a pressure accumulator which upon expansion causes projection of said piston member and plunger and releasable restraining means carried by said body and engaging said member to normally prevent projection of said plunger.

6. A hypodermic injection apparatus according to claim 5 and in which braking means cooperates with said plunger to limit its speed of projection thereof, said braking means comprising a normally retracted element shiftable with respect to and carried with said plunger, said element being shiftable into engagement with a surface fixed with respect to said body to effect a braking action and means connecting said plunger and element to cause such shifting of the latter.

7. A hypodermic injection apparatus as defined in claim 5, said pressure accumulator comprising a spring under compression and means connecting said pressure-increasing means with said spring.

8. A hypodermic injection apparatus as defined in claim 5, said pressure accumulator comprising a space embraced within said piston plunger and filled with a compressed fluid and said pressure-increasing means comprising a member projectible into said space to further compress such fluid.

9. A hypodermic injection apparatus as defined in claim 5, said medicament chamber comprising a cup-shaped flexible member, the base of which is acted upon by said plunger, means for securing the edge zone of said member against movement with respect to said body and said plunger causing the side walls of said member to invert upon themselves as said plunger acts to shift the base of the same towards said edge zone.

10. A hypodermic injection device as defined in claim 5, said piston-retaining means comprising a latch manually shiftable to release said piston for projection, a carriage movably supported by said body and mounting said latch and means for normally preventing movement of said carriage with respect to said body.

References Cited in the file of this patent

UNITED STATES PATENTS

| | | |
|---|---|---|
| 798,093 | Dean | Aug. 29, 1905 |
| 2,221,739 | Reiter | Nov. 12, 1940 |
| 2,322,244 | Lockhart | June 22, 1943 |
| 2,322,245 | Lockhart | June 22, 1943 |
| 2,380,534 | Lockhart | July 21, 1945 |
| 2,398,544 | Lockhart | Apr. 16, 1946 |

FOREIGN PATENTS

| | | |
|---|---|---|
| 505,931 | France | May 17, 1920 |